United States Patent [19]
Smith

[11] 3,877,858
[45] Apr. 15, 1975

[54] SAFETY MECHANISM
[75] Inventor: Roger S. Smith, Burton, Ohio
[73] Assignee: Newbury Industries, Inc., Newbury, Ohio
[22] Filed: May 28, 1974
[21] Appl. No.: 473,934

[52] U.S. Cl. ............... 425/152; 83/DIG. 1; 83/399; 83/544; 100/53; 425/151
[51] Int. Cl. .............................................. B29f 1/00
[58] Field of Search ............ 425/151, 152, DIG. 45, 425/153; 83/DIG. 1, 399, 400, 544; 100/53

[56] References Cited
UNITED STATES PATENTS

| | | | |
|---|---|---|---|
| 3,541,950 | 11/1970 | Anderson | 100/53 |
| 3,728,057 | 4/1973 | Grundmann et al. | 425/151 X |
| 3,734,664 | 5/1973 | Bosyk | 425/151 |
| 3,744,949 | 7/1973 | Hehl | 425/153 |

FOREIGN PATENTS OR APPLICATIONS

| | | | |
|---|---|---|---|
| 1,045,358 | 10/1966 | United Kingdom | 100/53 |
| 57,067 | 10/1952 | France | 100/53 |

Primary Examiner—Francis S. Husar
Assistant Examiner—David S. Safran
Attorney, Agent, or Firm—Michael Williams

[57] ABSTRACT

The invention relates to safety mechanism for machinery which incorporates relatively movable parts that cooperate to perform a work function. The movable parts are disposed within an enclosure and access to the latter is controlled by what is known as a safety gate. When the gate is open, the operator of the machine may inspect, adjust or replace the relative movable machine parts, and usually the operator's hands are required to be within the enclosure during such operations. The improved safety mechanism of my invention is gravity-operated to prevent movement of the machine parts toward each other whenever the gate is open, to thus guard against injury to the machine operator.

10 Claims, 5 Drawing Figures

PATENTED APR 15 1975

3,877,858

SAFETY MECHANISM

BACKGROUND AND SUMMARY

Safety devices which prevent access to an enclosure when a safety gate is open are known in the prior art. However, to my knowledge, such devices have depended on spring or cam action to activate the device to prevent movement of the machine parts toward each other, and springs or cams have been found unreliable for the purpose. In the case of springs, the spring could be damaged or fatigued and leave the safety device in an inoperative position. In the case of cams, additional mechanism is required to operate the cam, and this may fail or get out of adjustment.

The safety mechanism of my invention is particularly useful in combination with the safety gate of an injection molding machine, although it will be appreciated that it may be used with other machines having relatively movable parts that may cause injury to the machine operator.

In injection molding machines, a stationary plate, such as part of the machine base, supports the stationary part of the forming mold or die, and a movable plate or platen, which moves toward and away from stationary plate as a function of the machine, supports the forming tool or movable part of the mold or die. The movable and stationary mold or die parts are contained within an enclosure and access to the latter is controlled by a safety gate. In order to gain access to the enclosure, and the mold or die parts therein, the machine operator is required to open the safety gate, and when this is done, the safety mechanism of my invention is automatically set to prevent the mold or die parts from closing on each other. The improved safety mechanism includes a offset-balanced member which swings under the influence of gravity to position wherein it blocks a hole through which a post must pass. The post is carried by the movable platen, and blockage of its movement will prevent the movable platen to close on the stationary platen and thus protects the operator against injury.

DESCRIPTION OF THE DRAWINGS

In the drawings accompanying this specification and forming a part of this application, there is shown, for purpose of illustration, an embodiment which my invention may assume, and in these drawings.

DESCRIPTION OF THE PREFERRED EMBODIMENT

Figure 1:
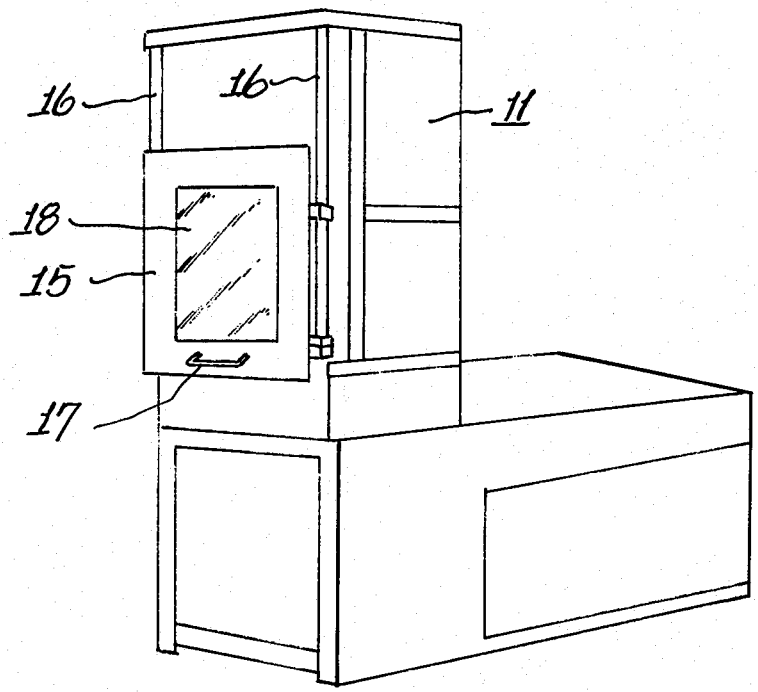
FIG. 1 is a small scale perspective view, generally showing an injection molding machine with which my invention may be employed.

FIG. 1 discloses a typical injection molding machine with which my invention may be incorporated. However, the invention may be incorporated in other machines having relatively movable parts, with a safety gate of some kind to control access thereto. The disclosed machine comprises a stationary base or platen 10 supported by base structure of the machine, and disposed within an enclosure 11 of any suitable formation. The stationary part of the mold or die (not shown) is connected to and supported by the base in customary manner.

Figure 3:
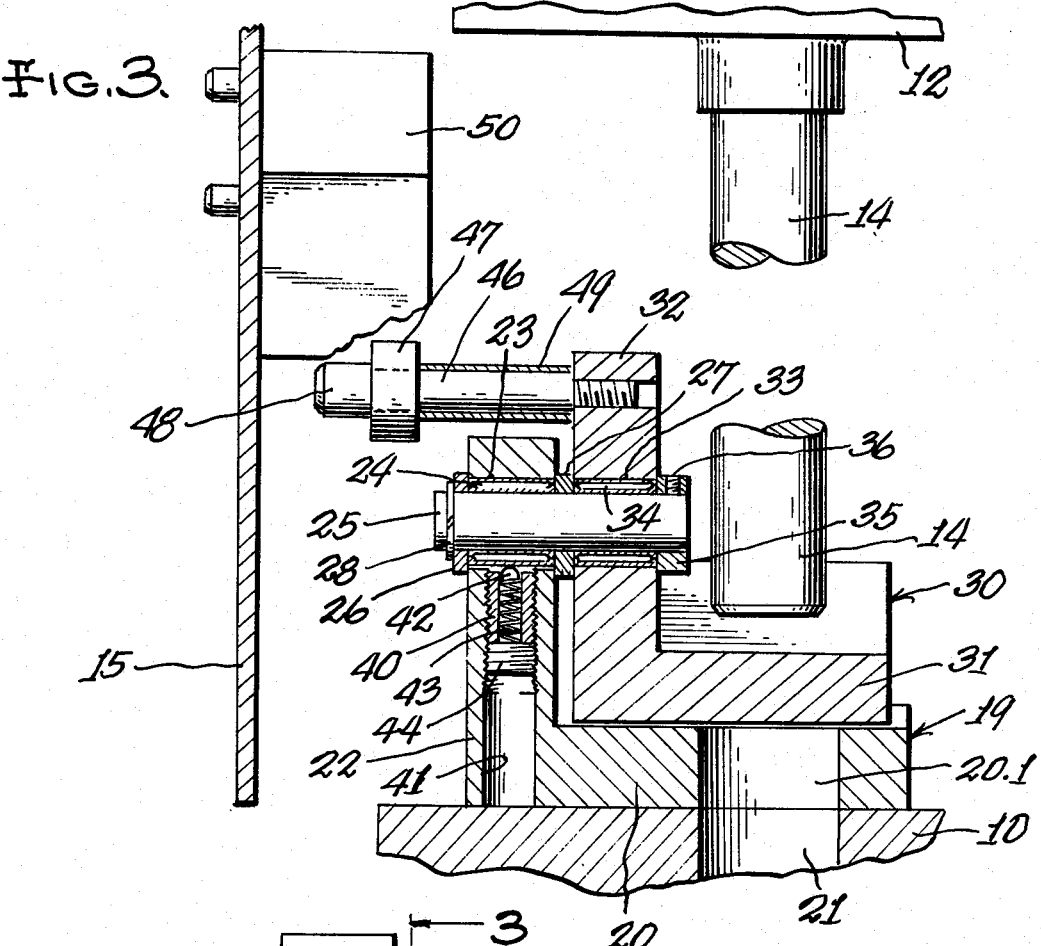
FIG. 3 is a vertical sectional view, corresponding generally to the line 3—3 of FIG. 4, and FIGS. 4 and 5 are end elevational views, respectively showing my improved safety device in blocking and unblocking positions.

Also within the enclosure 11 is the movable platen indicated by the reference numeral 12 in FIG. 3. The movable part of the mold or die (not shown) is connected to and moves with the platen 12 for cooperation with the mold or die part carried by the base 10. A post, such as a steel rod 14, is connected to the platen 12, preferably at a corner thereof, and depends therefrom for a purpose to be disclosed.

A safety gate 15 is provided to control access to the enclosure 11, and may be of any conventional type. In FIG. 1, the safety gate 15 comprises a door which is movable vertically along guide rods 16, 16. A hand pull 17 is provided so that the operator may move the door to its upper and lower positions. In some cases the door is moved horizontally, but in any case, my improved safety mechanism may be adapted for cooperation with the safety gate, as will be explained later. The gate 15 shown in FIG. 1 is provided with a transparent window 18 to provide for viewing of the mold or die action, even when the door is closed.

An L-shaped bracket 19 provides a part of my improved safety mechanism and includes a base member 20 adapted to be bolted to the upper surface of the stationary platen 10 in position so that an opening 20.1 therein is axially aligned with the vertical movement of the rod 14, and is of a size to freely pass the rod. The stationary platen 10 may be formed with a similar opening 21 to insure adequate passage of the rod. The bracket further includes an upstanding portion 22, preferably integral with the base member 20.

The upstanding portion 22 has a circular opening 23 therethrough and, although not clearly shown in the drawing, this opening is vertically elongated a slight amount, for a purpose to be disclosed. A bearing 24 is disposed within the opening 23 and, in the structure herein disclosed, the bearing is of the needle bearing type to provide for free rotation of a shaft 25 mounted therein. The cage of the bearing 24 is circular, and has limited vertical movement within the opening 23. Washers 26 and 27 encircle the shaft 25 on opposite sides of the upstanding bracket portion 22, and a split ring 28 holds the shaft against axial movement in one direction.

Cooperable with the bracket 19 is a guard 30 which is also L-shaped in cross-section to provide a horizontal arm 31 and an integral vertical arm 32. The vertical arm is provided with a circular opening 33 to receive a needle bearing 34. The shaft 25 extends through the bearing 34 and a sleeve 35 is held fixed to the end of the shaft by a set screw 36. The assembly thus far described provides for free and easy swinging movement of the guard 30 about the axis of the shaft 25.

Figure 2:
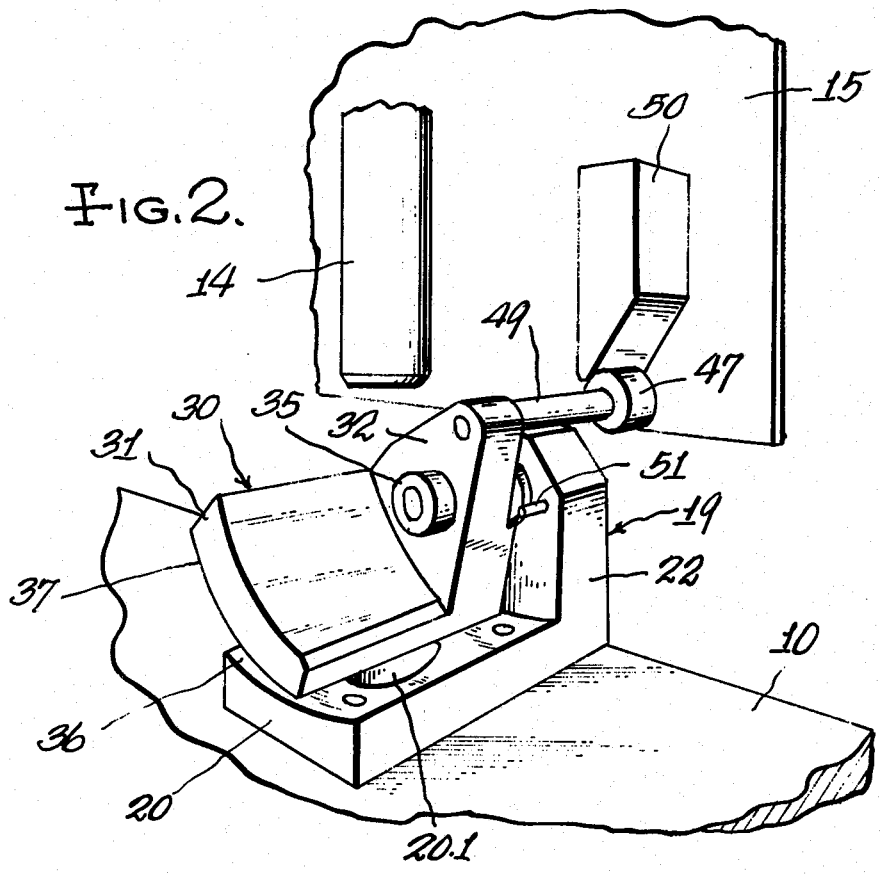
FIG. 2 is an enlarged, perspective view showing the safety mechanism of my invention in operative relation with parts of the machine shown in FIG. 1.
Figure 4:
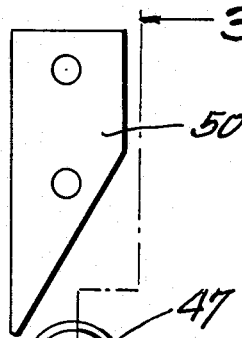
Figure 5:
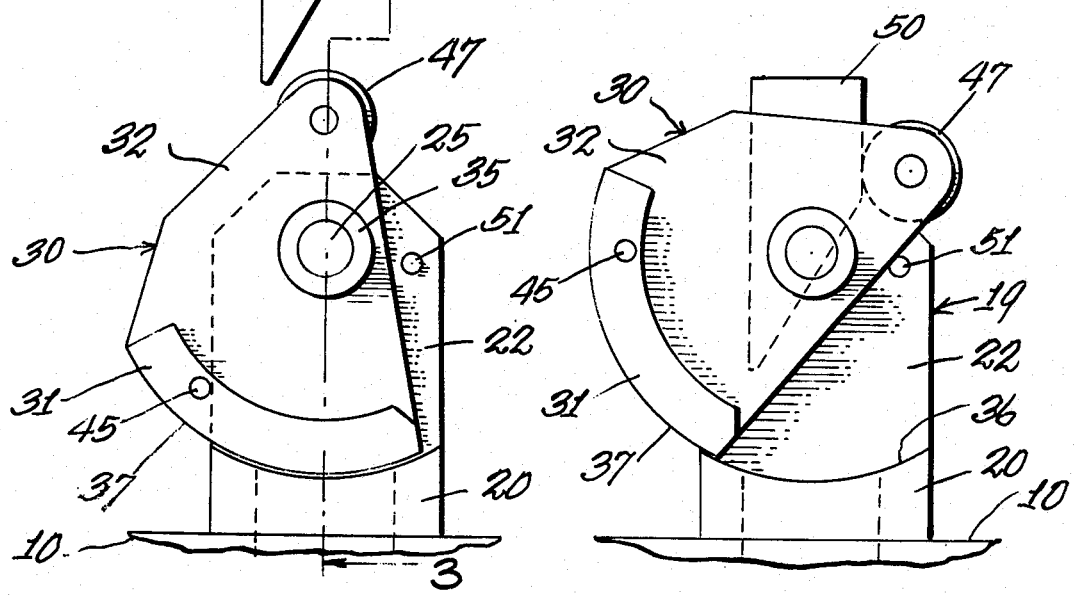

As seen in FIGS. 2, 4 and 5, the upper surface 36 of the bracket base member has a concave curvature with the axis of the rod 25 as the center. The horizontal arm 31 of the guard has an undersurface 37 which has a convex curvature which mates with the curvature of the bracket surface 36. As seen in FIG. 3, a sleeve 40 is threaded into a vertical opening 41 in the bracket portion 22. A ball 42 and spring 43 are contained within the sleeve, and a plug 44 is threaded into the opening 41 and forms an abutment for the lower end of the spring so that the ball 42 is pushed upwardly to in turn push the cage of needle bearing 24 upwardly in the vertically elongated hole 23. In this position of parts, the curved surfaces 36, 37 are slightly separated so as not to create any frictional drag to oppose free swinging action of the guard.

It will be noted, especially in FIGS. 4 and 5, that the guard is mounted in offset relation to induce a pivot-point weight differential to insure that the guard is always urged, by gravity, to the position shown in FIG. 4. A pin 45 carried by the horizontal arm 31 of the guard 30 engages a side surface of the bracket portion 22 to limit the amount the guard will swing in the counter-clockwise direction as viewed in FIG. 4.

A bolt 46 is threaded into the upper part of the guard vertical arm 32 and extends in the direction toward the safety gate 15. A roller 47 is mounted on the bolt, between the bolt head 48 and a spacer sleeve 49. The gate 15 has a cam member 50 bolted thereto, the member having an inclined cam surface cooperable with the roller 47.

When the gate 15 is closed, the cam member 50 is in engagement with the roller 47, as seen in FIG. 5, to swing the guard 30 to a position wherein its horizontal arm 31 does not cover the openings 20.1, 21 in the bracket and stationary platen, and the upper platen 12 may therefore be moved completely downwardly, the lower end of the rod 14 freely extending through the openings 20.1, 21. A side of the guard 30 will engage with a pin 51 carried by the upstanding portion 22 after the guard has been swung its full amount to limit movement of the latter.

In the event the operator is required to inspect, adjust or change the molds or dies carried by the platens 10 and 12, he will preferably first move the platen 12 to its upper position to withdraw the rod 14 from the opening 20.1 in the bracket base member 20. The operator must then lift the gate 15 in order to gain access to the enclosure 11. When the gate is fully opened, the cam member 50 will have been moved clear of the roller 47, as seen in FIG. 4, so that the guard 30 will swing under influence of its offset-balanced condition, to cover the hole 201 in the bracket base member 20.

In the event the operator does not move the platen 12 upwardly before opening the gate 15, the rod 14 will prevent swinging of the guard 30 to its position seen in FIG. 4. However, if the platen 12 is subsequently moved upwardly, the guard 30 will automatically swing to its position in FIG. 4.

With the guard 30 covering the opening 20.1 in the bracket base member 20, the upper platen cannot be moved to fully closed position with respect to the lower stationary platen 10 since the lower end of the rod 14 will be blocked by the guard arm 31. If the upper platen is moved toward its lower position, the lower end of the rod 14 will strike the upper surface of guard arm 31 and lower the latter into firm abutting relation with the bracket base member 20, and this will provide an adequate stop, without imposing any strain on the pivot rod 25 or its related parts.

In the event the platens 10 and 12, and gate 15, are mounted for horizontal movement, my improved safety device is still operable and may be mounted on the stationary platen in a position it would assume if the sheet containing FIGS. 3, 4 and 5 of the drawings were rotated so that its right hand margin were lowermost.

I claim:

1. Safety mechanism for a machine having a pair of plates, each adapted to mount one of a pair of complementary members for performing a work operation, said plates being movable toward and away from each other to respectively bring said complementary members to operative and inoperative positions, said mechanism comprising:

a safety gate movable from one position wherein it blocks accessibility to said plates and members, to another position wherein it permits such accessibility, a bracket connected to one of said plates, having an opening therein, a post connected to the other of said plates, and extending therefrom, the end of the post extending into said opening when said complementary members are in operative position, and removed from said opening when said complementary members are in inoperative position, a guard movably carried by said bracket and urged to position to cover said opening and thereby prevent said post end from entering said opening, whereby said complementary members are prevented from being moved to operative position, and means movable with said safety gate and operable to move said guard to a position clear of said opening when said safety gate has been moved to said one position.

2. The construction according to claim 1 wherein said guard is weighted and disposed in off-balanced condition so that gravity alone urges it to position to close said opening.

3. The construction according to claim 1 wherein said guard is pivotally carried by said bracket.

4. The construction according to claim 3 wherein said pivotal connection supports said guard in off-set balanced condition to influence a pivot point weight differential to insure a weight over friction safety factor, and thus urge said guard to position to close said opening.

5. The construction according to claim 4 and further including a cam carried by and movable with said safety gate, said cam being engageable with said guard to swing the latter clear of said opening when said safety gate is in said one position.

6. The construction according to claim 3 wherein said guard and said bracket have respective complementarily curved convex and concave surfaces with the center of the curvature located at the axis of the pivotal connection between said guard and bracket, said pivotal connection having limited floating movement to provide for engagement and disengagement of said complementarily curved surfaces, and means to urge said pivotal connection to a position wherein said complementarily curved surfaces are slightly spaced to provide for free pivotal swinging of said guard relative to said bracket.

7. The construction according to claim 6 wherein engagement of said post end with said guard when the latter covers said bracket opening causes said complementarily curved surfaces to engage and provide a solid abutment opposing further movement of said post in the direction of said opening in said bracket.

8. The construction according to claim 1 wherein said plates are superposed platens, the lower platen being stationary and supporting said bracket, and the upper platen being vertically movable toward and away from said lower platen.

9. The construction according to claim 8 wherein said bracket is L-shaped and has a base portion secured to said stationary platen and an upright portion extending upwardly from said stationary platen, and wherein said guard is L-shaped, having a horizontal arm overlying said bracket base portion and a vertical arm pivoted to said bracket upright portion, said bracket opening being formed in said bracket base portion and the horizontal arm of said guard being swingable to cover or uncover said opening, and said post being vertically arranged and connected to and depending from said upper platen.

10. The construction according to claim 9 wherein said safety gate is vertically movable, a cam carried by said safety gate, and a roller carried by the vertical arm of said guard in off-set relation to the pivot between said bracket and guard, said roller being engaged by said safety gate cam when said gate is moved downward and operable to swing said guard horizontal arm to uncover said bracket opening and permit said post end to enter said bracket opening.

* * * * *